(12) United States Patent
Sugiyama

(10) Patent No.: US 11,156,858 B2
(45) Date of Patent: Oct. 26, 2021

(54) OPTICAL DEVICE THAT INCLUDES OPTICAL MODULATOR

(71) Applicant: Fujitsu Optical Components Limited, Kawasaki (JP)

(72) Inventor: Masaki Sugiyama, Kawasaki (JP)

(73) Assignee: FUJITSU OPTICL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/917,121

(22) Filed: Jun. 30, 2020

(65) Prior Publication Data

US 2021/0033897 A1    Feb. 4, 2021

(30) Foreign Application Priority Data

Aug. 2, 2019  (JP) .............................. JP2019-142708

(51) Int. Cl.
*G02F 1/065* (2006.01)
*G02F 1/225* (2006.01)
*G02B 6/122* (2006.01)
*G02B 6/12* (2006.01)
*G02F 1/21* (2006.01)

(52) U.S. Cl.
CPC ........... *G02F 1/065* (2013.01); *G02B 6/1221* (2013.01); *G02F 1/225* (2013.01); *G02B 2006/12142* (2013.01); *G02F 1/212* (2021.01)

(58) Field of Classification Search
CPC .......... G02F 1/065; G02F 1/225; G02F 1/212; G02B 6/1221; G02B 2006/12142
USPC ......................................................... 385/1–3
See application file for complete search history.

(56) References Cited

U.S. PATENT DOCUMENTS

| | | | | |
|---|---|---|---|---|
| 5,069,517 A | * | 12/1991 | Kersten | .................. G02F 1/065 385/130 |
| 5,533,151 A | * | 7/1996 | Leonard | ............... G02B 6/1221 359/321 |
| 6,355,198 B1 | | 3/2002 | Kim et al. | |
| 6,377,716 B1 | * | 4/2002 | Veldhuis | ............... G02F 1/0147 385/1 |
| 6,856,752 B2 | * | 2/2005 | Bischel | ................ G02B 27/283 359/288 |
| 6,895,162 B2 | * | 5/2005 | Bintz | ..................... G02B 6/132 385/129 |
| 2005/0133943 A1 | * | 6/2005 | Akutsu | ................. B29C 39/026 264/1.28 |

(Continued)

*Primary Examiner* — Robert Tavlykaev
(74) *Attorney, Agent, or Firm* — Staas & Halsey, LLP

(57) ABSTRACT

An optical device includes an optical modulator on an optical IC chip. The optical modulator includes an optical waveguide, first and second wiring patterns that are formed along the optical waveguide and a polymer pattern. A portion of the polymer pattern is formed on the optical waveguide and located in a region between the first and second wiring patterns. Each of the first and second wiring patterns includes a modulation portion that is formed parallel to the optical waveguide, a pad portion, and a transition portion that connects the modulation portion and the pad portion. A shape of a region between the transition portion of the first wiring pattern and the transition portion of the second wiring pattern is a curve. The polymer pattern has a curved portion in the region between the transition portion of the first wiring pattern and the transition portion of the second wiring pattern.

7 Claims, 11 Drawing Sheets

(56) References Cited

U.S. PATENT DOCUMENTS

| | | | |
|---|---|---|---|
| 2009/0067796 A1* | 3/2009 | Fujii | G02B 6/4202 385/129 |
| 2009/0079099 A1* | 3/2009 | Shimizu | G02B 6/138 264/1.24 |
| 2010/0166362 A1* | 7/2010 | Fujii | G02B 6/4214 385/14 |
| 2010/0202731 A1* | 8/2010 | Mitsumori | G02B 6/122 385/31 |
| 2013/0121631 A1 | 5/2013 | Yu et al. | |

* cited by examiner

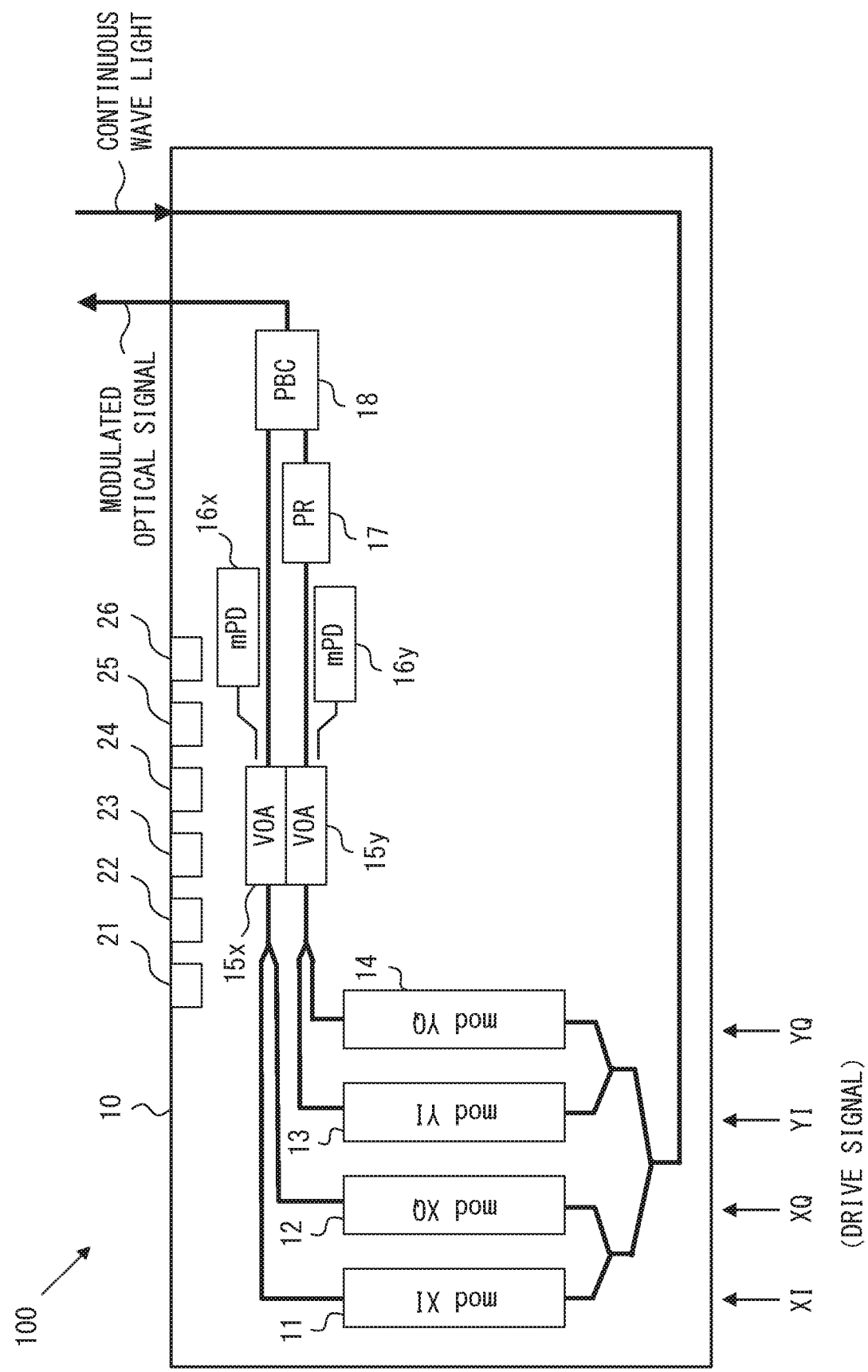
F I G. 1

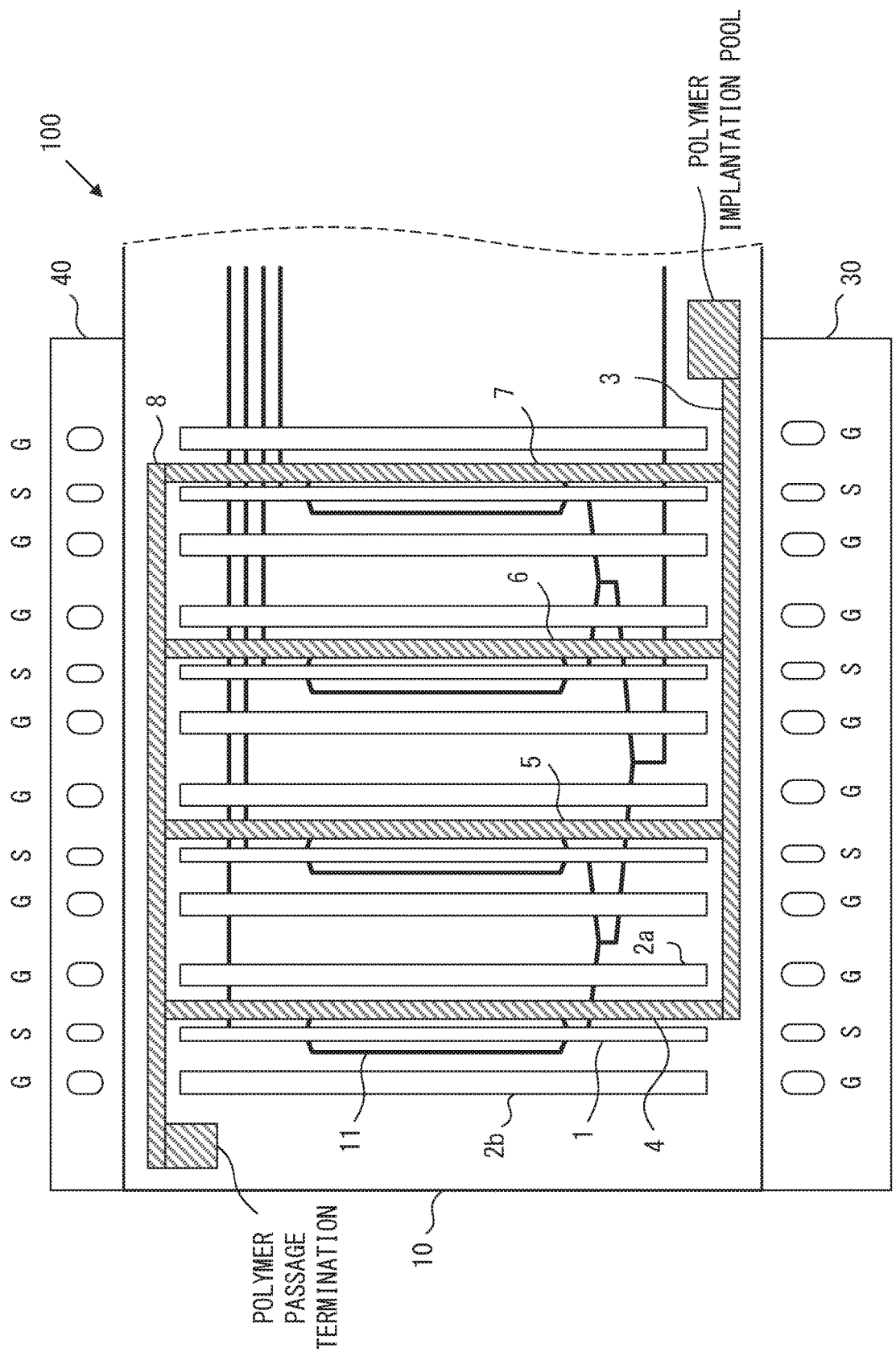

OPTICAL DEVICE THAT INCLUDES OPTICAL MODULATOR

CROSS-REFERENCE TO RELATED APPLICATION

This application is based upon and claims the benefit of priority of the prior Japanese Patent Application No. 2019-142708, filed on Aug. 2, 2019, the entire contents of which are incorporated herein by reference.

FIELD

The embodiments discussed herein are related to an optical device that includes an optical modulator.

BACKGROUND

An optical modulator is one of key devices for implementing an optical communication system. The size of optical modulators is required to be reduced to reduce the size of optical transmission devices implemented in nodes in the optical communication system.

Forming optical modulators on silicon substrates has been put into practical use as one technique for attaining size reduction of the optical modulators. In such a configuration, an optical waveguide is formed on a silicon substrate, and an electrode and a PN junction are provided in the vicinity of the optical waveguide. The refractive index of the optical waveguide is dependent on an electric field applied to the PN junction. Thus, applying an electric-field signal indicating data to the PN junction causes light passing through the optical waveguide to be modulated in accordance with the electric-field signal. Thus, a modulated optical signal indicating the data is generated.

However, a change in the refractive index of the optical waveguide is small relative to a change in the electric field applied to the PN junction. Hence, implementing sufficient modulation involves increasing the drive voltage of a signal to be applied to the PN junction, resulting in large power consumption. To solve or reduce this problem, an optical modulator using a polymer (i.e., polymeric material), instead of a PN junction, has been proposed. For example, a polymer pattern may be formed on optical waveguides forming a Mach-Zehnder interferometer. An electric-field signal indicating data is applied to the polymer pattern. The refractive index of the optical waveguide changes greatly based on a change in the electric field applied to the polymer pattern. Hence, this configuration implements sufficient modulation without increasing the drive voltage.

Techniques for forming optical waveguides using an electro-optic (EO) polymer have been proposed as relevant techniques (e.g., U.S. Pat. No. 6,355,198 and U.S. 2013/0121631).

For example, a polymer pattern to which a drive signal of an optical modulator is applied may be formed by implanting a polymer material through a passage provided between wiring patterns (or metal interconnections) used as electrodes for optical modulators on the surface of an optical IC (Integrated Circuit) chip. Reflection of an electric signal on the optical IC chip is reduced preferably by reducing the spacing between wiring patterns so as to decrease impedance. Hence, the width of the passage for flow of a polymer material will be decreased in a configuration in which a polymer pattern is formed between wiring patterns. As a result, the flow of the polymer material could be hindered in a region with a narrow passage, thereby decreasing the productivity of optical devices.

SUMMARY

According to an aspect of the embodiments, an optical device includes an optical modulator formed on an optical IC (Integrated Circuit) chip. The optical modulator includes an optical waveguide, a first wiring pattern that is formed on one side of the optical waveguide, a second wiring pattern that is formed on the other side of the optical waveguide, a first polymer pattern that is formed along one edge of the IC chip, and a second polymer pattern that is connected to the first polymer pattern, at least a portion of the second polymer pattern being formed on the optical waveguide and located in a region between the first wiring pattern and the second wiring pattern. The first wiring pattern includes a first modulation portion that is formed parallel to the optical waveguide, a first pad portion that is formed at an end portion of the first wiring pattern, and a first transition portion that connects the first modulation portion and the first pad portion. The second wiring pattern includes a second modulation portion that is formed parallel to the optical waveguide, a second pad portion that is formed at an end portion of the second wiring pattern, and a second transition portion that connects the second modulation portion and the second pad portion. A shape of a region between the first transition portion and the second transition portion is a curve. The second polymer pattern has a curved portion in the region between the first transition portion and the second transition portion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical device in accordance with embodiments of the invention;

FIG. 4 illustrates optical waveguides, wiring patterns, and polymer patterns forming a modulator;

DESCRIPTION OF EMBODIMENTS

Figure 2:
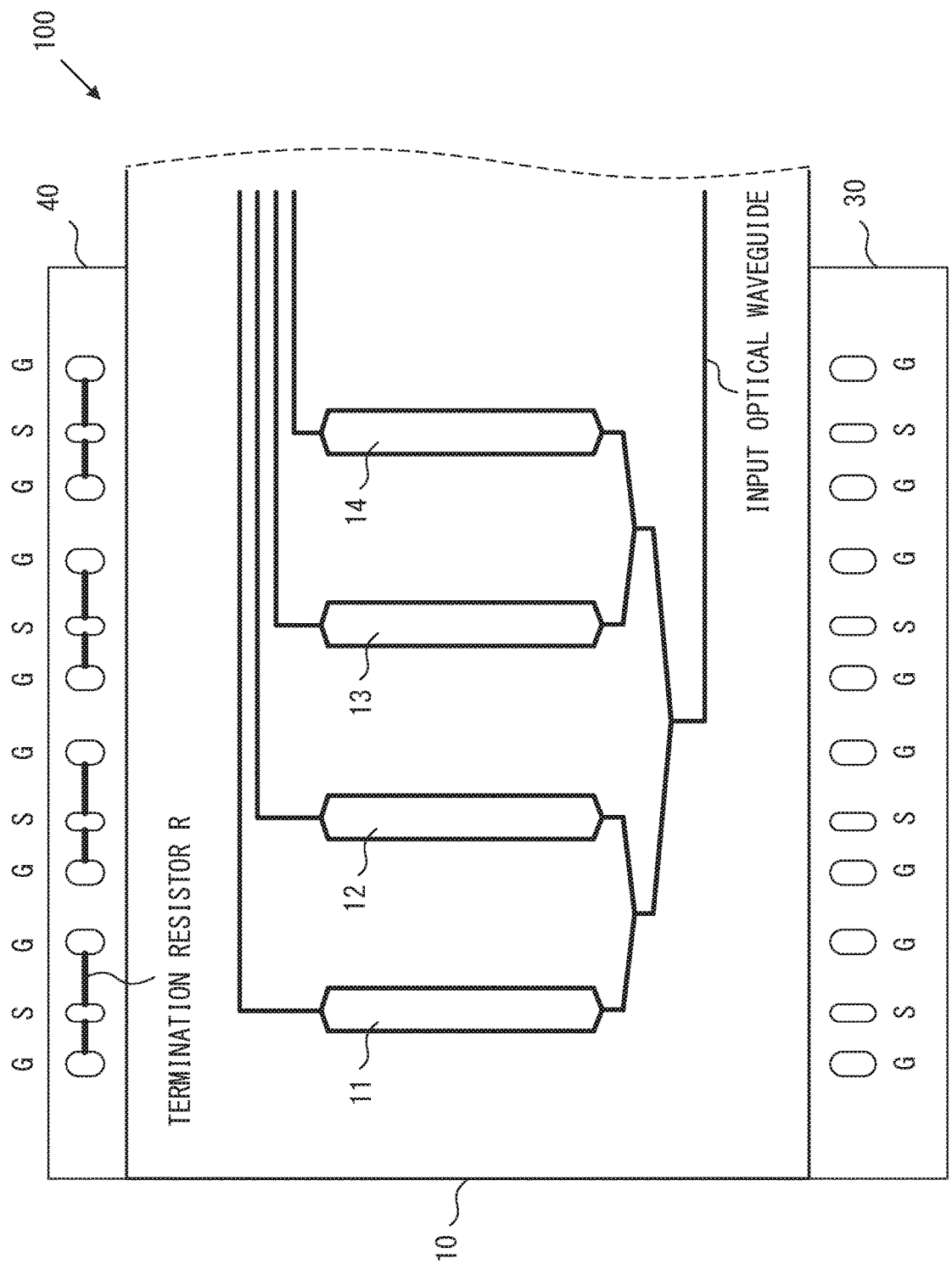
FIG. 2 illustrates optical waveguides forming a modulator.

FIG. 1 illustrates an example of an optical device in accordance with embodiments of the invention. An optical device 100 in accordance with embodiments of the invention includes an optical modulator formed on an optical IC chip 10. In this example, the optical IC chip 10 is formed on a silicon wafer. In this case, a plurality of optical IC chips are formed on the silicon wafer. Thus, the optical IC chip 10 is one of the plurality of optical IC chips cut out of the silicon wafer. In this example, the optical modulator generates a polarization multiplexed optical signal.

As depicted in FIG. 1, the optical modulator includes modulators 11-14, variable optical attenuators (VOAs) 15x and 15y, monitor photodetectors (mPDs) 16x and 16y, a polarization rotator (PR) 17, and a polarization beam combiner (PBC) 18. The optical modulator may include other elements that are not depicted in FIG. 1.

In this example, the optical IC chip 10 is shaped like a rectangle. However, the present invention is not limited to this configuration. For example, the optical IC chip 10 may be shaped like a parallelogram.

The modulators 11-14 are optically coupled to an input port via an optical waveguide. Accordingly, continuous wave light is input to the modulators 11-14. The modulators 11, 12, 13, and 14 are respectively supplied with drive signals XI, XQ, YI, and YQ. The drive signals XI and XQ are generated according to a data signal X. The drive signals YI and YQ are generated according to a data signal Y. The modulator 11 generates a modulated optical signal XI by modulating the input continuous wave light with the drive signal XI. Similarly, the modulators 12, 13, and 14 generate modulated optical signals XQ, YI, and YQ, respectively.

The modulated optical signals XI and XQ are combined to generate a modulated optical signal X. In this case, the modulated optical signals XI and XQ are combined to have a specified phase difference between these signals by a bias supplied via a pad 21. The modulated optical signal X indicates the data signal X. Similarly, the modulated optical signals YI and YQ are combined to generate a modulated optical signal Y. In this case, the modulated optical signals YI and YQ are combined to have a specified phase difference between these signals by a bias supplied via a pad 22. The modulated optical signal Y indicates the data signal Y.

The variable optical attenuator 15x adjusts power of the modulated optical signal X. Similarly, the variable optical attenuator 15y adjusts power of the modulated optical signal Y. In this case, for example, the variable optical attenuators 15x and 15y may equalize the powers of the modulated optical signals X and Y in accordance with power control signals supplied via the pads 23 and 24.

The monitor photodetector 16x detects the power of the modulated optical signal X. Similarly, the monitor photodetector 16y detects the power of the modulated optical signal Y. The powers detected by the monitor photodetectors 16x and 16y are reported to a controller (not illustrated) via pads 25 and 26. In response to this, the controller generates power control signals for controlling the variable optical attenuators 15x and 15y.

The polarization rotator 17 controls the polarization of the modulated optical signal X or Y. In this example, the polarization rotator 17 controls the polarization of the modulated optical signal Y. As an example, the polarization rotator 17 may control the polarization of the modulated optical signal Y in a manner such that the polarizations of the modulated optical signals X and Y become orthogonal to each other. The polarization beam combiner 18 generates a polarization multiplexed optical signal by combining the modulated optical signals X and Y. The polarization multiplexed optical signal is guided to an output port via an optical waveguide.

The optical device 100 may include other elements that are not depicted in FIG. 1. For example, the optical device 100 may include an optical receiver in addition to the optical modulator. In this case, the optical device 100 is operated as an optical transceiver.

Figure 3:
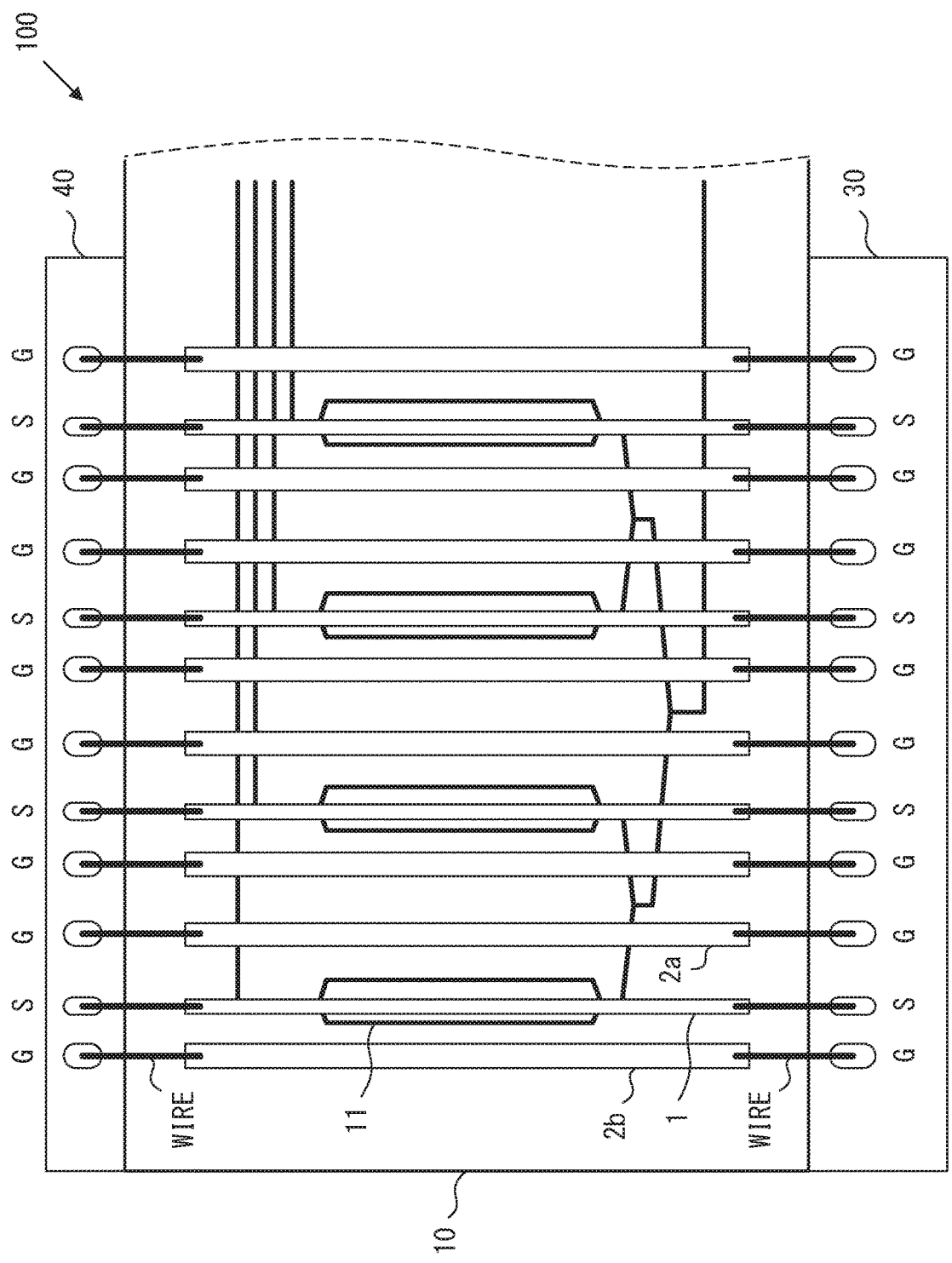
FIG. 3 illustrates optical waveguides and wiring patterns forming a modulator.

FIGS. 2-4 illustrate an example of the configuration of an optical modulator. Note that FIGS. 2-4 depict the modulators 11-14 depicted in FIG. 1, and the variable optical attenuators 15x and 15y, the monitor photodetectors 16x and 16y, the polarization rotator 17, and the polarization beam combiner 18 illustrated in FIG. 1 are not depicted in FIGS. 2-4.

FIG. 2 illustrates optical waveguides forming modulators 11-14. In this example, each of the modulators 11-14 is implemented using a Mach-Zehnder interferometer. In particular, each of the modulators 11-14 includes a pair of optical waveguides. The pair of optical waveguides are substantially the same in length and formed substantially parallel to each other. An input optical waveguide is optically coupled to an input terminal of each of the modulators 11-14. Accordingly, continuous wave light input to the optical device 100 is guided to the modulators 11-14 via the input optical waveguide, as depicted in FIG. 1.

The optical device 100 includes a driver board 30 and a terminator board 40, as depicted in FIG. 2. The driver board 30 is provided with signal pads and ground pads. In FIGS. 2-4, S represents a signal pad, and G represents a ground pad. In this example, one signal pad S and two ground pads G are provided for each of the modulators 11-14. A signal pad S is provided between two ground pads G. The signal pads S are connected to a drive circuit for generating a drive signal. The ground pads G are connected to a ground. The drive circuit may be implemented on the driver board 30 or may be provided outside the driver board 30.

The terminator board 40 is also provided with signal pads S and ground pads G. In this example, one signal pad S and two ground pads G are provided for each of the modulators 11-14. A signal pad S is provided between two ground pads G. Termination resistors R are provided between the signal pads S and the ground pads G. The termination resistors R are not depicted in FIGS. 3-4.

FIG. 3 illustrates optical waveguides and wiring patterns forming modulators 11-14. Each of the wiring patterns is formed parallel to an optical waveguide forming a Mach-Zehnder interferometer. Each of the wiring patterns is electrically connected to corresponding pads formed on the driver board 30 and the terminator board 40 via metal wires.

For example, the modulator 11 may include wiring patterns 1, 2a, and 2b. The wiring pattern 1 is formed to overlap an optical waveguide forming a Mach-Zehnder interferometer. The wiring pattern 1 is connected to a corresponding signal pad S provided on the driver board 30 and a corresponding signal pad S provided on the terminator board 40 via metal wires. The wiring patterns 2a and 2b are formed to sandwich the Mach-Zehnder interferometer. Each of the wiring patterns 2a and 2b is connected to a corresponding ground pad G provided on the driver board 30 and a corresponding ground pad G provided on the terminator board 40 via metal wires. The metal wires are implemented using a metal with a high conductivity. The configurations of the modulators 12-14 are substantially the same as that of the modulator 11.

FIG. 4 illustrates optical waveguides, wiring patterns, and polymer patterns forming modulators 11-14. In this example, for each of the modulators 11-14, a polymer pattern is formed along one of a pair of optical waveguides forming a Mach-Zehnder interferometer. Note that the polymer patterns are represented by hatched regions. The polymer patterns are formed by applying an electro-optical polymer (EO polymer) to the surface of the optical IC chip 10.

FIGS. 5A-7B illustrate an example of a fabrication process for an optical modulator. The following describes an example of a procedure for forming optical waveguides, wiring patterns, and polymer patterns on an optical IC chip. In this example, an optical modulator is formed using an SOI substrate depicted in FIG. 5A. The SOI substrate includes a silicon substrate, a Si layer, and a BOX layer ($SiO_2$ film) as an insulation layer between the silicon substrate and the Si layer.

Figure 5A:
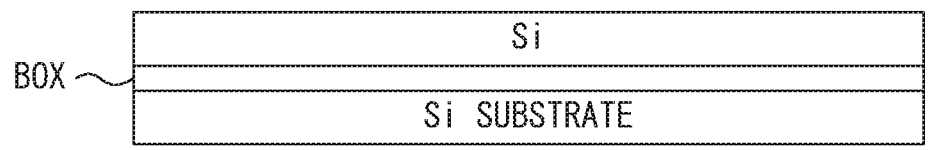
FIGS. 5A-5D, 6A-6D, and 7A-7B illustrate an example of a fabrication process for an optical modulator.
Figure 5B:
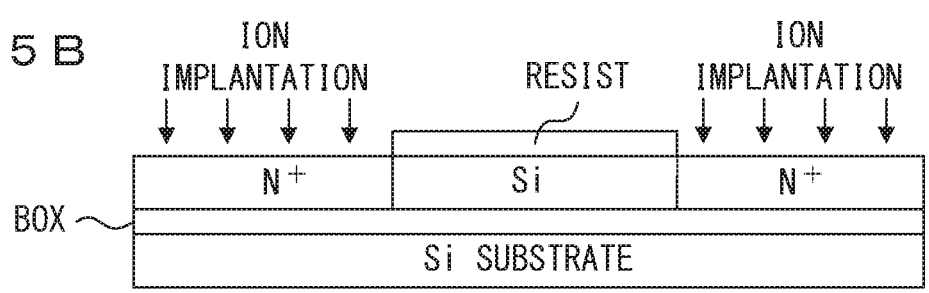

In FIG. 5B, $N^+$ regions are formed in the Si layer. In this case, the $N^+$ regions are formed by selectively implanting N-type ions into the Si layer by means of a resist film. Note that the $N^+$ regions are formed in the vicinity of a region in which an optical waveguide is to be formed in a later process.

Figure 5C:
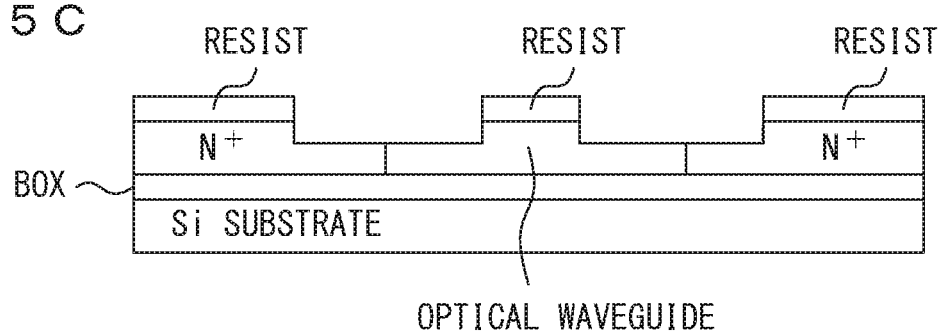

In FIG. 5C, an optical waveguide is formed. In this case, the optical waveguide is formed by etching the Si layer and the $N^+$ regions by means of the resist film.

Figure 5D:
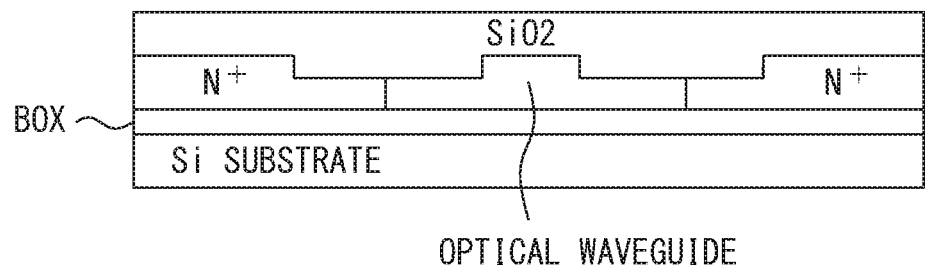
Figure 6A:
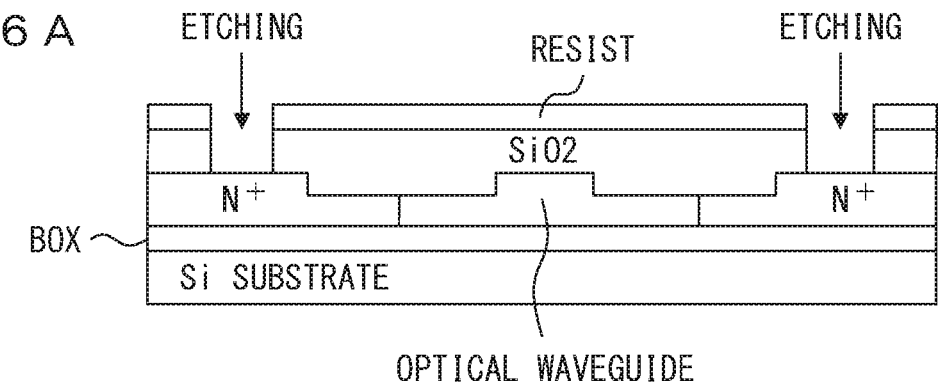
Figure 6B:
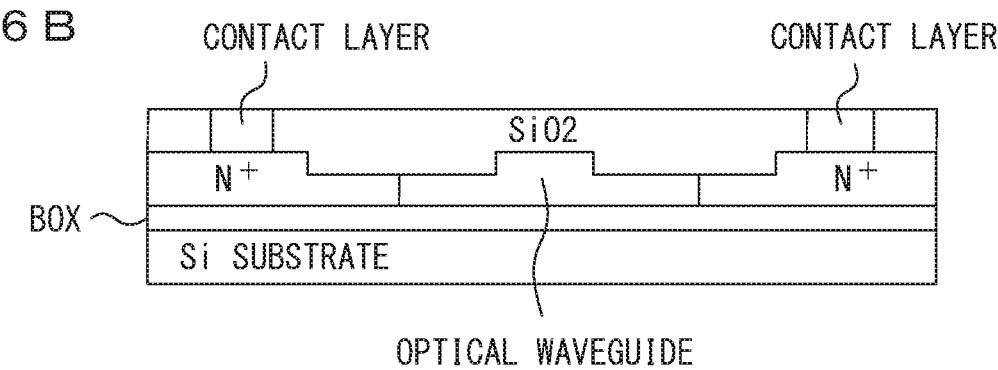

In FIGS. 5D-6B, contact layers are formed. In particular, an oxide film is formed over surfaces of the Si layer and the $N^+$ regions, as depicted in FIG. 5D. Then, as depicted in FIG. 6A, portions of the oxide film over the surfaces of the $N^+$ regions are removed via etching by means of a resist film. As a result, contact layers are formed in oxide-film-removed regions, as depicted in FIG. 6B. That is, contact layers to be electrically connected to the $N^+$ regions are formed.

Figure 6C:
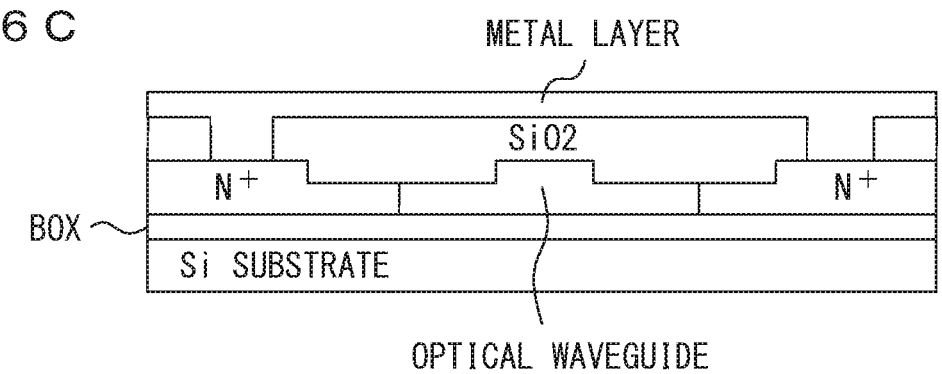
Figure 6D:
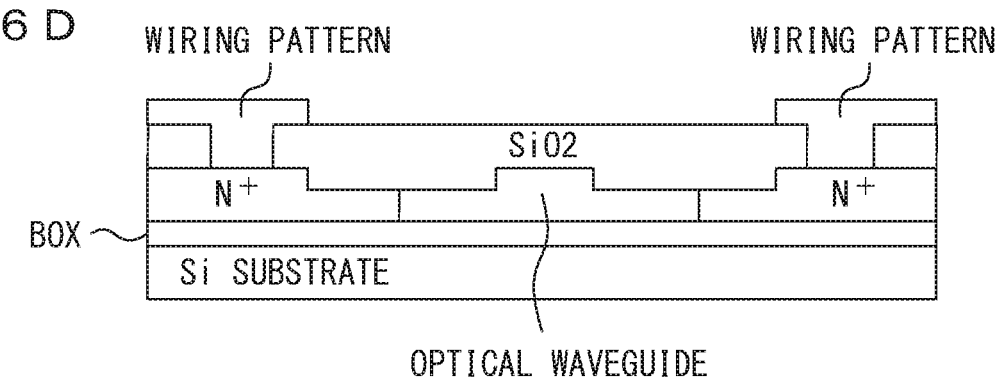

In FIGS. 6C-6D, wiring patterns are formed. In particular, a metal layer is formed over the surface of the oxide film, as depicted in FIG. 6C. Then, wiring patterns are formed by selectively removing the metal layer, as depicted in FIG. 6D.

Figure 7A:
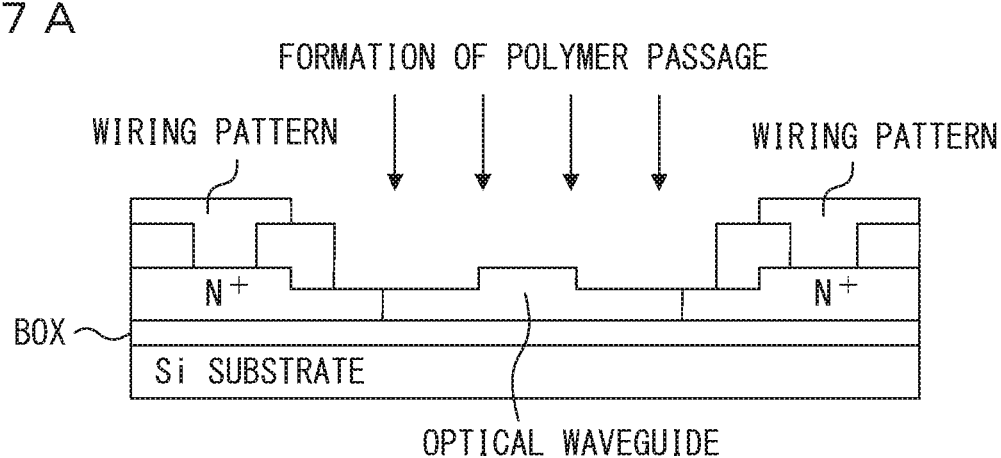
Figure 7B:
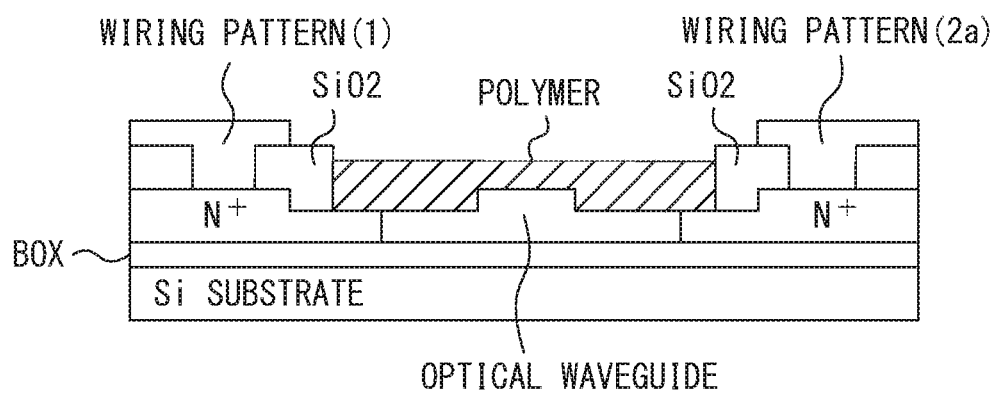

In FIGS. 7A-7B, a polymer pattern is formed. In particular, as depicted in FIG. 7A, a polymer passage is formed by selectively removing the oxide film formed over the surface of the optical IC chip 10. Then, the polymer pattern depicted in FIG. 4 is formed by implanting a polymer material through the polymer passage. In this case, the polymer pattern is formed in contact with the optical waveguide, as depicted in FIG. 7B. Specifically, a polymer pattern is formed in contact with one of a pair of optical waveguides forming a Mach-Zehnder interferometer. Subsequently, as depicted in FIG. 3, each wiring pattern and a corresponding pad on the driver board 30 and each wiring pattern and a corresponding pad on the terminator board 40 are connected by metal wires.

Assume, for example, that the two wiring patterns depicted in FIG. 7B are the wiring patterns 1 and 2a depicted in FIG. 3 and the optical waveguide depicted in FIG. 7B is one of the optical waveguides of the Mach-Zehnder interferometer forming the modulator 11 depicted in FIGS. 2-3. In this case, the drive signal of the modulator 11 is applied to the polymer pattern via the wiring pattern 1 and the $N^+$ region in contact with the wiring pattern 1. The polymer pattern is electrically connected to a ground via the $N^+$ region and the wiring pattern 2a. Thus, an electric field corresponding to the drive signal is applied to the polymer pattern, resulting in a change in the refractive index of the optical waveguide in accordance with the drive signal. Accordingly, modulation corresponding to the drive signal is implemented.

As described above, the polymer pattern for applying the drive signal of the optical modular to the optical waveguide is formed by forming a polymer passage on the surface of the optical IC chip 10 and implanting a polymer material through the polymer passage. In the example depicted in FIG. 4, a polymer material is implanted into a polymer implantation pool and then caused to flow toward a polymer passage termination, thereby forming polymer patterns.

Specifically, in FIG. 4, the polymer material flows leftward from the polymer implantation pool, thereby forming an inflow-passage polymer pattern 3. The polymer material also flows upward from the inflow-passage polymer pattern 3, thereby forming channel polymer patterns 4-7. The channel polymer patterns 4-7 are respectively formed on the optical waveguides forming interferometers 11-14 depicted in FIG. 1. In addition, the polymer material from the upper ends of the channel polymer patterns 4-7 flows toward the polymer passage termination, thereby forming an outflow-passage polymer pattern 8. In this case, the polymer patterns 3-8 are formed on the surface of the optical IC chip 10 without overlapping the wiring patterns.

Figure 8A:
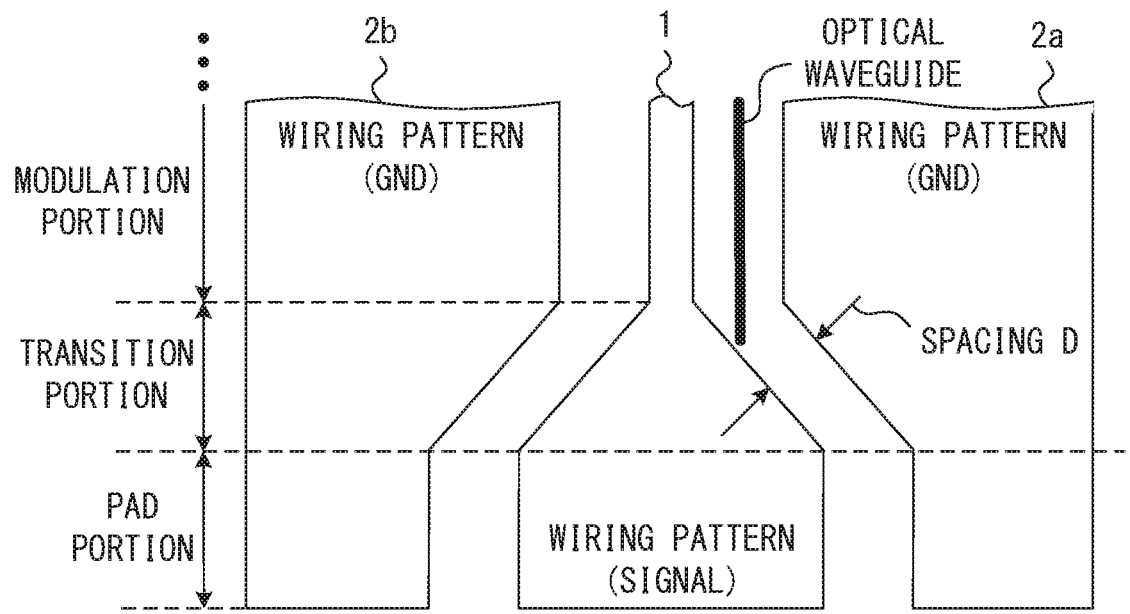
FIGS. 8A and 8B illustrate an example of the configuration of portions of wiring patterns and polymer patterns at an end portion of an optical modulator.
Figure 8B:
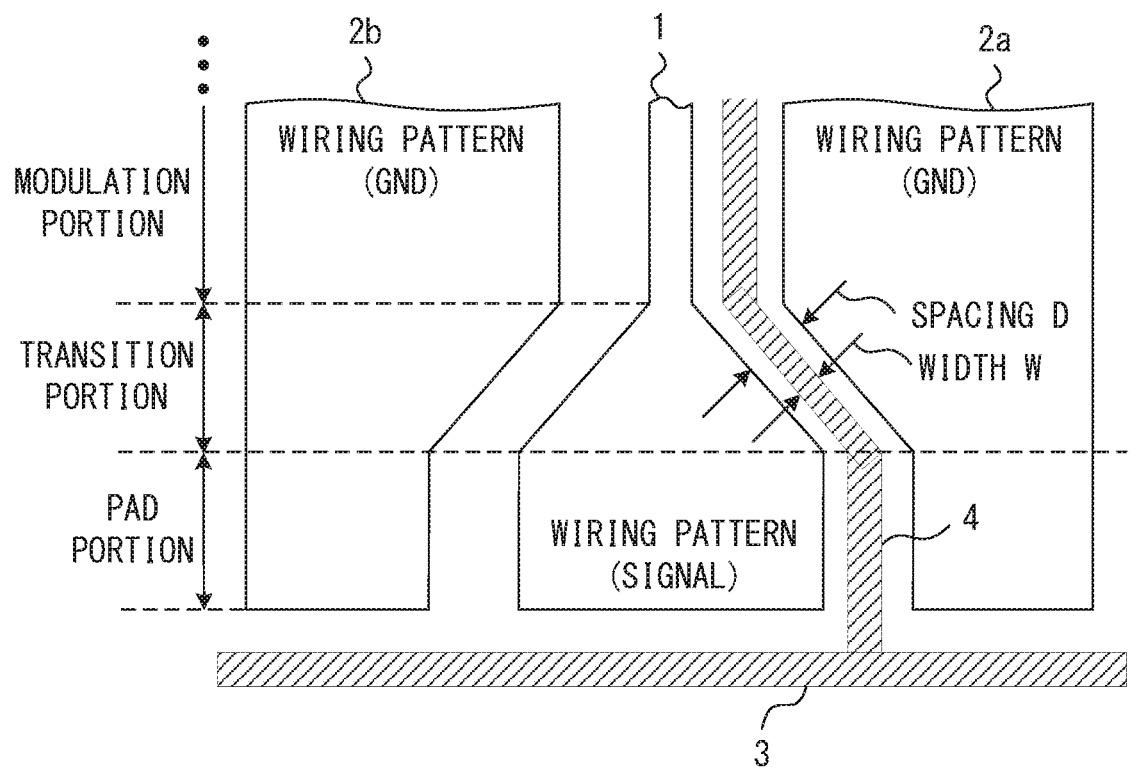

FIGS. 8A and 8B illustrate an example of the configuration of portions of wiring patterns and polymer patterns at an end portion of an optical modulator. In the following, the configuration of an end portion of one modulator (e.g., modulator 11) of four modulators that form an optical modulator is indicated. To facilitate visualization, FIGS. 8A and 8B depict components of the modulator separately. In particular, FIG. 8A does not depict polymer patterns but does depict an optical waveguide and wiring patterns. FIG. 8B does not depict the optical waveguide but does depict the wiring patterns and the polymer patterns.

The optical waveguide depicted in FIG. 8A corresponds to one of the pair of optical waveguides included in the interferometer forming the modulator 11 depicted in FIGS. 1-4. The wiring patterns 1, 2a, and 2b depicted in FIGS. 8A and 8B correspond to the wiring patterns 1, 2a, and 2b depicted in FIGS. 3-4. Thus, the wiring pattern 1 propagates a drive signal supplied from the driver board 30. The wiring patterns 2a and 2b are connected to a ground. The inflow-passage polymer pattern 3 and the channel polymer pattern 4 depicted in FIG. 8B correspond to the inflow-passage polymer pattern 3 and the channel polymer pattern 4 depicted in FIG. 4.

Each of the wiring patterns 1, 2a, and 2b includes a modulation portion, a pad portion, and a transition portion. A modulation portion corresponds to a portion formed parallel to an optical waveguide. A pad portion is formed at an end portion of each wiring pattern and corresponds to a portion to which a metal wire depicted in FIG. 3 is bonded. A transition portion corresponds to a portion connecting a modulation portion and a pad portion. The pad portion of the wiring pattern 1 for propagating a drive signal is formed by extending the width of the wiring pattern relative to the modulation portion. Note that the width of the transition portion of the wiring pattern 1 changes in a tapering manner (gradually decreases in a direction from the pad portion toward the modulation portion).

As described above, the polymer patterns are formed by implanting a polymer material into the polymer implantation pool depicted in FIG. 4. In this case, the polymer material flows through a passage for the inflow-passage polymer pattern 3 and also flows a passage for the channel polymer pattern 4.

Reflection of an electric signal on the optical IC chip 10 is reduced preferably by reducing the spacing between the wiring pattern 1 and the wiring pattern 2a and by reducing the spacing between the wiring pattern 1 and the wiring pattern 2b so as to decrease impedance. In the example depicted in FIGS. 8A and 8B, a spacing D is preferably reduced.

However, reducing the spacing D will decrease the width W of a passage for a channel polymer pattern 4 to be formed between the wiring pattern 1 and each of the wiring patterns 2a and 2b. In particular, a region between the wiring patterns 1 and 2a will be bent at the transition portions, and hence the width W of the passage for the channel polymer pattern 4 will be decreased in this region. If the width W of the passage is small, the polymer material will not smoothly flow, and the channel polymer pattern 4 (and the channel polymer patterns 5-7) could not be formed in a desired shaped. Accordingly, the productivity of the optical IC chip 10 or the optical device 100 could be decreased.

Embodiments

Figure 9A:
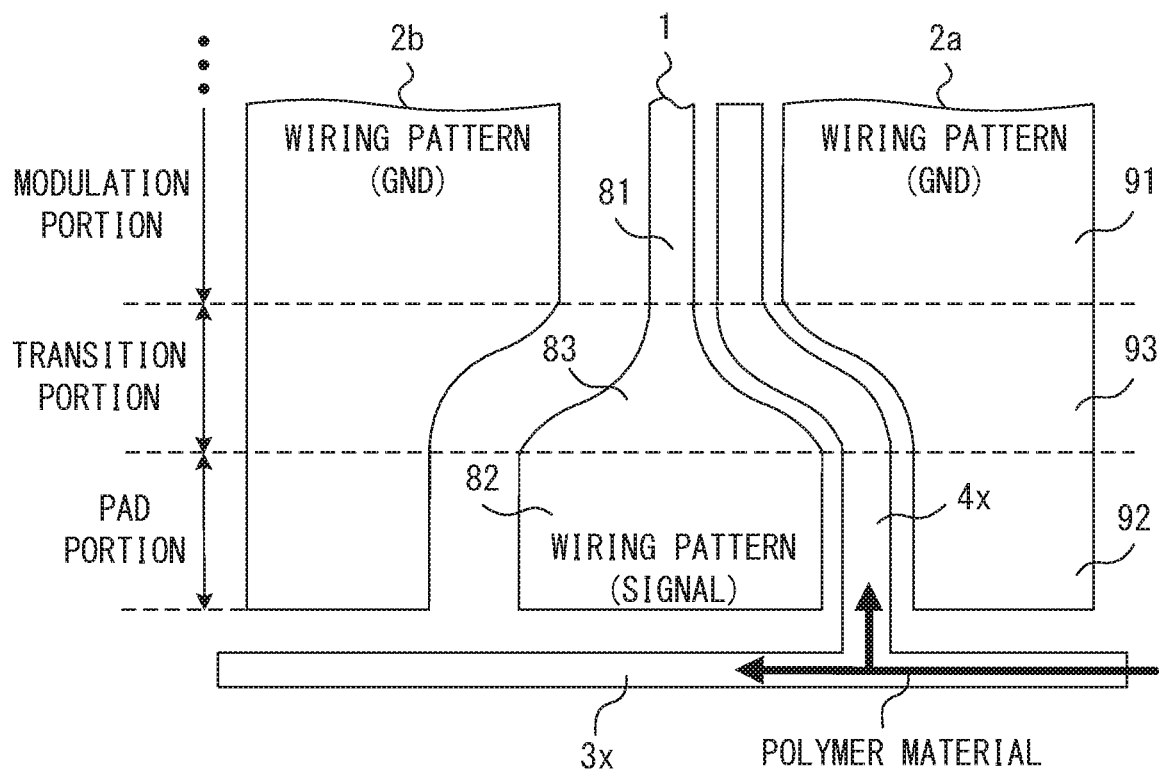
FIGS. 9A and 9B illustrate an example of the configuration of portions of wiring patterns and polymer patterns at an end portion of an optical modulator in accordance with embodiments of the invention.
Figure 9B:
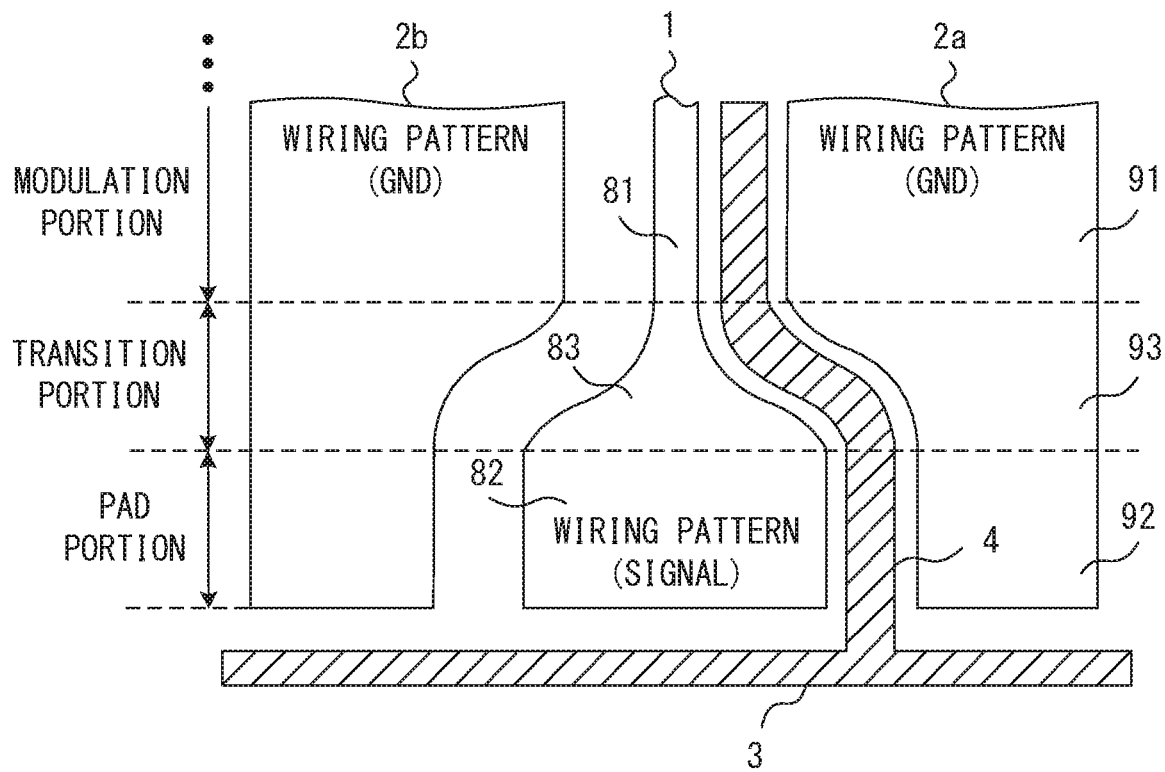

FIGS. 9A and 9B illustrate an example of the configuration of portions of wiring patterns and polymer patterns at an end portion of an optical modulator in accordance with embodiments of the invention. In the following, the configuration of an end portion of one modulator (e.g., modulator 11) of four modulators that form an optical modulator is indicated, as in the case of FIGS. 8A and 8B. As with FIG. 8B, FIGS. 9A and 9B do not depict the optical waveguide but do depict the wiring patterns and the polymer patterns.

The wiring patterns 1, 2a, and 2b depicted in FIGS. 9A and 9B correspond to the wiring patterns 1, 2a, and 2b depicted in FIGS. 3-4. Thus, the wiring pattern 1 propagates a drive signal supplied from the driver board 30. The wiring patterns 2a and 2b are connected to a ground.

FIG. 9A indicates a state before a polymer material is implanted into the polymer passages. FIG. 9B indicates a state after a polymer material is implanted into the polymer passages. Accordingly, FIG. 9A depicts polymer passages 3x and 4x. Implanting a polymer material into the polymer passage 3x forms an inflow-passage polymer pattern 3. Implanting a polymer material into the polymer passage 4x forms a channel polymer pattern 4. The inflow-passage polymer pattern 3 and the channel polymer pattern 4 depicted in FIG. 9B correspond to the inflow-passage polymer pattern 3 and the channel polymer pattern 4 depicted in FIG. 4, respectively.

Each of the wiring patterns includes a modulation portion, a pad portion, and a transition portion. For example, the wiring pattern 1 may include a modulation portion 81, a pad portion 82, and a transition portion 93. The wiring pattern 2a includes a modulation portion 91, a pad portion 92, and a transition portion 93. A modulation portion corresponds to a portion formed parallel to an optical waveguide. A pad portion is formed at an end portion of each wiring pattern and corresponds to a portion to which a metal wire depicted in FIG. 3 is bonded. A transition portion corresponds to a portion connecting a modulation portion and a pad portion.

The polymer passage 3x depicted in FIG. 9A is formed along one edge of the optical IC chip. The polymer passage 4x is formed in a region between the wiring patterns 1 and 2a. The polymer passages 3x and 4x are formed in the process depicted in FIG. 7A. The polymer material implanted into the polymer implantation pool depicted in FIG. 4 flows through the polymer passages 3x and 4x. In this case, the flow of the polymer material through the polymer passage 3x is branched and led to the polymer passage 4x. As a result, the inflow-passage polymer pattern 3 and the channel polymer pattern 4 are formed as depicted in FIG. 9B.

In embodiments of the invention, the region between the transition portion 83 of the wiring pattern 1 and the transition portion 93 of the wiring pattern 2a is curved. That is, the wiring patterns 1 and 2a are formed such that the region between the transition portions 83 and 93 is curved. The polymer passage 4x may be formed at the center of the region between the wiring patterns 1 and 2a. Accordingly, the polymer pattern 3 formed by implanting the polymer material through the polymer passage 4x has a curved portion in the region between the transition portion 83 of the wiring pattern 1 and the transition portion 93 of the wiring pattern 2a.

As described above, the polymer passage 4x formed in the region between the wiring patterns 1 and 2 (in particular, the region between the transition portions 83 and 93) has a curved portion. Accordingly, the configuration depicted in FIGS. 9A and 9B allows the portion of the polymer passage 4x at the transition portions to have a greater width than in a configuration in which the portion of the polymer passage at the transition portions extends in a straight line (see FIG. 8B), on the assumption that these configurations are equal in spacing between the wiring patterns 1 and 2a. Thus, the polymer material flowing from the polymer passage 3x into the polymer passage 4x will flow smoothly through the portion of the polymer passage 4x between the transition portions 83 and 93 and the channel polymer pattern 4 is formed. Accordingly, the productivity of the optical IC chip 10 or the optical device 100 is improved.

On the assumption that the configuration depicted in FIGS. 8A and 8B and the configuration depicted in FIGS. 9A and 9B are equal in spacing between the wiring patterns 1 and 2a, the width W of the portion of the channel polymer pattern 4 at the transition portion depicted in FIGS. 8A and 8B will be less than that in FIGS. 9A and 9B. In other words, on the assumption that the configuration depicted in FIGS. 8A and 8B and the configuration depicted in FIGS. 9A and 9B are equal in width of the channel polymer pattern 4, the spacing between the transition portions of the wiring patterns 1 and 2a depicted in FIGS. 9A and 9B will be smaller than that in FIGS. 8A and 8B. Accordingly, in embodiments of the invention, the impedances between the wiring patterns can be decreased while improving the productivity of the optical IC chip 10 or the optical device 100. As a result, the impedances of the wiring pattern for propagating the electric signal can be easily matched, thereby reducing reflection of the electric signals on the optical IC chip 10.

The width of the polymer passage 4x (i.e., width of the channel polymer pattern 4) is preferably substantially the same in the pad portion, the transition portion, and the modulation portion. In this case, in the process of causing a polymer material to flow through the polymer passage, the polymer material flows to the modulation portion without being bottlenecked in the middle of the polymer passage 4x.

Figure 10A:
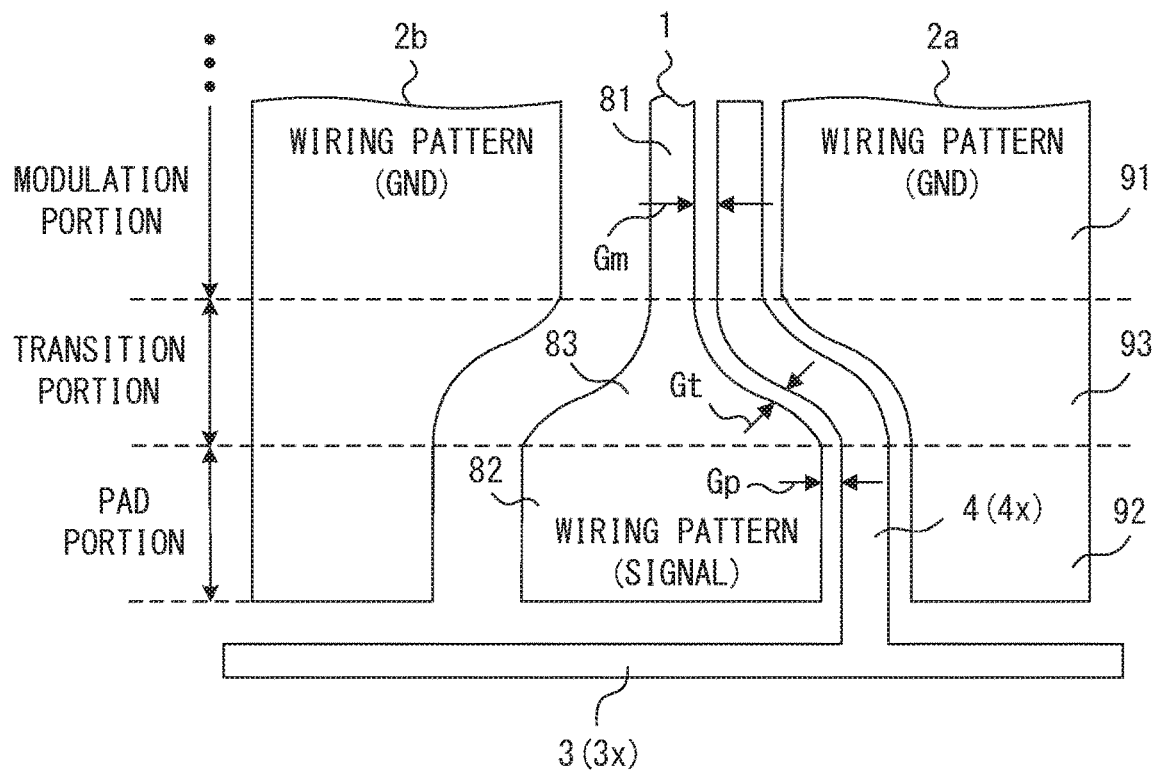
FIGS. 10A and 10B illustrate variations of the configurations of wiring patterns and polymer patterns.

As depicted in FIG. 10A, a spacing Gm between the channel polymer pattern 4 and the modulation portion 81 of the wiring pattern 1, a spacing Gt between the channel polymer pattern 4 and the transition portion 83 of the wiring pattern 1, and a spacing Gp between the channel polymer pattern 4 and the pad portion 82 of the wiring pattern 1 are preferably substantially equal. Similarly, although not illustrated, a spacing Gm between the channel polymer pattern 4 and the modulation portion 91 of the wiring pattern 2a, a spacing Gt between the channel polymer pattern 4 and the transition portion 93 of the wiring pattern 2a, and a spacing Gp between the channel polymer pattern 4 and the pad portion 92 of the wiring pattern 2a are also preferably substantially equal. In addition, the spacing between the channel polymer pattern 4 and the wiring pattern 1 and the spacing between the channel polymer pattern 4 and the wiring pattern 2a are also preferably substantially equal. In such a configuration, the impedances of the wiring pattern for propagating the electric signal can be easily matched, thereby reducing reflection of the electric signal on the optical IC chip 10.

Figure 10B:
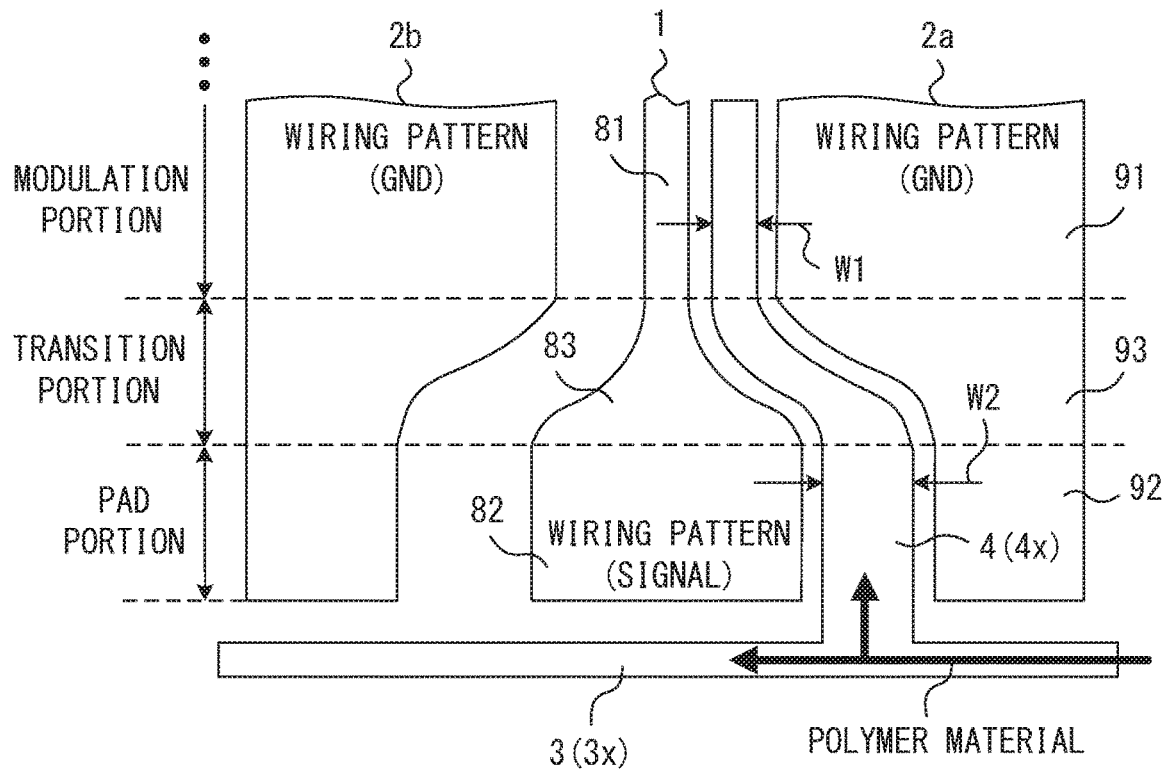

Furthermore, when the polymer material does not flow smoothly from the polymer passage 3$x$ into the polymer passage 4$x$, the spacing between the pad portion 82 of the wiring pattern 1 and the pad portion 92 of the wiring pattern 2$a$ may be increased as depicted in FIG. 10B to increase the width of a portion of the channel polymer pattern 4 formed at the pad portions. That is, a width W2 of a portion of the channel polymer pattern 4 formed at the pad portions may be greater than a width W1 of the portion of the channel polymer pattern 4 formed at the modulation portions. In such a configuration, the polymer material flows smoothly from the polymer passage 3$x$ into the polymer passage 4$x$, thereby improving the productivity of the optical IC chip 10 or the optical device 100.

Transceiver Module

Figure 11:
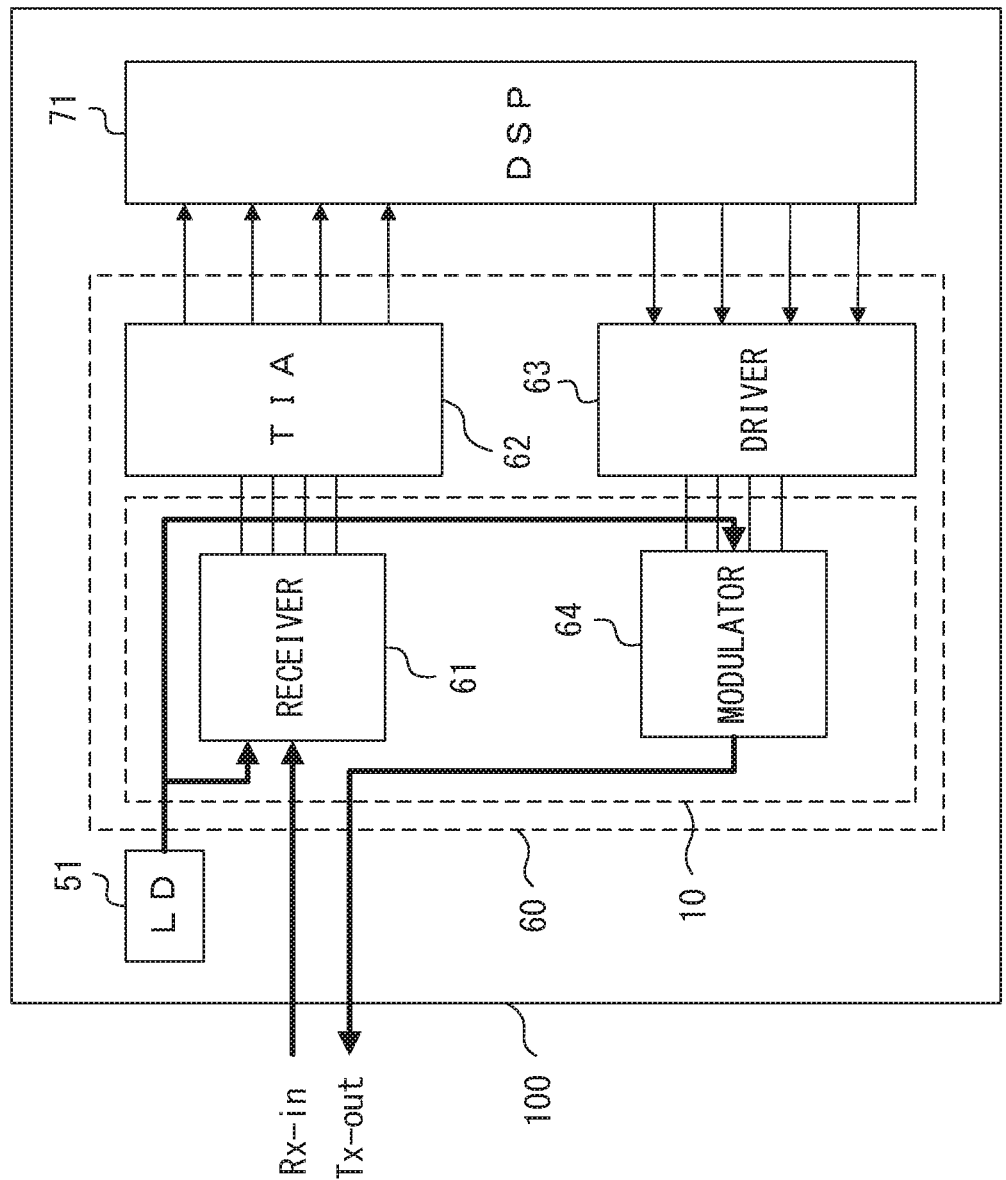
FIG. 11 illustrates an example of an optical device that includes a transceiver module.

FIG. 11 illustrates an example of an optical device that includes a transceiver module. In this example, an optical device 100 includes a light source 51, a transceiver package 60, and a DSP 71. The transceiver package 60 includes a receiver 61, a TIA circuit 62, a driver circuit 63, and a modulator 64. For example, the receiver 61 and the modulator 64 may be implemented in the optical IC chip 10 depicted in FIG. 1. The modulator 64 is implemented by, for example, the configuration depicted in FIGS. 2-4. The optical device 100 may include elements that are not depicted in FIG. 11.

The light source 51 generates continuous wave light of a specified wavelength. The continuous wave light is guided to the modulator 64 via an optical waveguide formed on the optical IC chip 10. When the receiver 61 is a coherent receiver, the continuous wave light is also guided to the receiver 61.

A received optical signal (Rx in) is guided to the receiver 61. For example, the receiver 61 may be a coherent receiver. In this case, the receiver 61 generates an electric-field-information signal indicating the received optical signal by using continuous wave light generated by the light source 51. The TIA circuit 62 converts the electric-field-information signal generated by the receiver 61 into a voltage signal and amplifies the voltage signal.

The digital signal processor (DSP) 71 recovers reception data from an electric-field-information signal indicating a received optical signal. Functions for recovering reception data may include a function for compensating for frequency offset, a function for compensating for waveform distortion, and a function for estimating a phase. The DSP 71 also generates a drive signal from transmission data. Functions for generating a drive signal may include a function for mapping in accordance with a modulation scheme.

The drive signal is amplified by the driver circuit 63 and guided to the modulator 64. The driver circuit 63 may be implemented in the driver board 30 depicted in FIGS. 2-4. The modulator 64 generates a modulated optical signal (Tx_out) by modulating continuous wave light with a drive signal supplied via the driver circuit 63.

The size of the transceiver module can be reduced by implementing the receiver 61 and the modulator 64 on the optical IC chip, as described above. In addition, introducing the configuration depicted in FIGS. 9A and 9B or FIGS. 10A and 10B improves the productivity of the optical IC chip 10 or the optical device 100.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical device that includes an optical modulator formed on an optical IC (Integrated Circuit) chip, wherein
   the optical modulator includes
      an optical waveguide,
      a first wiring pattern that is formed on one side of the optical waveguide,
      a second wiring pattern that is formed on the other side of the optical waveguide,
      a first polymer pattern that is formed along one edge of the IC chip, and
      a second polymer pattern that is connected to the first polymer pattern, at least a portion of the second polymer pattern being formed on the optical waveguide and located in a region between the first wiring pattern and the second wiring pattern,
   the first wiring pattern includes
      a first modulation portion that is formed parallel to the optical waveguide,
      a first pad portion that is formed at an end portion of the first wiring pattern, and
      a first transition portion that connects the first modulation portion and the first pad portion,
   the second wiring pattern includes
      a second modulation portion that is formed parallel to the optical waveguide,
      a second pad portion that is formed at an end portion of the second wiring pattern, and
      a second transition portion that connects the second modulation portion and the second pad portion,
   a shape of a region between the first transition portion and the second transition portion is a curve, and
   the second polymer pattern has a curved portion in the region between the first transition portion and the second transition portion.

2. The optical device according to claim 1, wherein a width of a portion of the second polymer pattern that is formed in a region between the first modulation portion and the second modulation portion is equal to a width of a portion of the second polymer pattern that is formed in the region between the first transition portion and the second transition portion.

3. The optical device according to claim 1, wherein a width of a portion of the second polymer pattern that is formed in a region between the first modulation portion and the second modulation portion is equal to a width of a portion of the second polymer pattern that is formed in a region between the first pad portion and the second pad portion.

4. The optical device according to claim 1, wherein a spacing between the second polymer pattern and the first modulation portion is equal to a spacing between the second polymer pattern and the first transition portion.

5. The optical device according to claim 1, wherein
a spacing between the second polymer pattern and the first modulation portion is equal to a spacing between the second polymer pattern and the first pad portion.
6. The optical device according to claim 1, wherein
a width of a portion of the second polymer pattern that is formed in a region between the first pad portion and the second pad portion is greater than a width of a portion of the second polymer pattern that is formed in a region between the first modulation portion and the second modulation portion.
7. The optical device according to claim 1, wherein
an optical receiver is further formed on the optical IC chip.

* * * * *